US010471916B2

(12) United States Patent
Dwyer

(10) Patent No.: US 10,471,916 B2
(45) Date of Patent: Nov. 12, 2019

(54) SEATBELT AIRBAG SAFETY DEVICE

(71) Applicant: The Boeing Company, Chicago, IL (US)

(72) Inventor: Jon Erik Dwyer, Everett, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 15/445,556

(22) Filed: Feb. 28, 2017

(65) Prior Publication Data

US 2018/0244233 A1    Aug. 30, 2018

(51) Int. Cl.
| | | |
|---|---|---|
| *B60R 21/276* | (2006.01) | |
| *B60R 22/32* | (2006.01) | |
| *B60R 21/18* | (2006.01) | |
| *B60R 21/16* | (2006.01) | |
| *B60R 22/28* | (2006.01) | |

(52) U.S. Cl.
CPC .............. *B60R 21/18* (2013.01); *B60R 21/16* (2013.01); *B60R 21/276* (2013.01); *B60R 22/28* (2013.01); *B60R 22/32* (2013.01); *B60R 2021/162* (2013.01); *B60R 2022/328* (2013.01)

(58) Field of Classification Search
CPC ................................................ B60R 2022/328
See application file for complete search history.

(56) References Cited

U.S. PATENT DOCUMENTS

| | | | | |
|---|---|---|---|---|
| 6,418,628 B1 * | 7/2002 | Steingass | ............... | A62B 3/005 30/366 |
| 8,146,192 B2 * | 4/2012 | McGlynn | ............... | A62B 3/005 224/162 |
| 9,925,952 B2 * | 3/2018 | Flegar | ..................... | B60R 22/32 |
| 2005/0230944 A1 * | 10/2005 | Coyle | .................... | B60R 21/16 280/733 |
| 2008/0222900 A1 * | 9/2008 | Lee | ......................... | B60R 22/32 30/298.4 |
| 2014/0157525 A1 * | 6/2014 | Locklear | ................. | B60R 22/32 7/158 |
| 2015/0033562 A1 | 2/2015 | Posey | | |
| 2016/0193981 A1 * | 7/2016 | Flegar | .................. | G04B 19/247 83/16 |
| 2017/0106831 A1 * | 4/2017 | Garabedian | ............. | B60R 22/32 |

FOREIGN PATENT DOCUMENTS

DE        2740361 A1 *  3/1979  ........... B60R 22/324

OTHER PUBLICATIONS

Extended European Search Report prepared by the European Patent Office in application No. 17 21 0285.7 dated Jul. 4, 2018.

* cited by examiner

*Primary Examiner* — Nicole T Verley
(74) *Attorney, Agent, or Firm* — McDonnell Boehnen Hulbert & Berghoff LLP

(57) ABSTRACT

Example devices, systems and methods for airbag anti-inflation are described. An example device includes an elongated member having a first end and a second end. The example device also includes a buckle retainer coupled to the first end of the elongated member. The device also includes a cutting member coupled to the second end of the elongated member. The cutting member includes a bottom section substantially perpendicular to the elongated member and a top section extending vertically from the bottom section. The cutting member also includes a through-hole defined by an interior surface of the bottom section of the cutting member and an interior surface of the top section of the cutting member.

13 Claims, 6 Drawing Sheets

SEATBELT AIRBAG SAFETY DEVICE

FIELD

The present disclosure relates generally to a safety-device that prevents harm to vehicle occupants or maintainers from undesired lap-belt-mounted airbag deployment (e.g. deployment when the airbag should be in a disabled mode).

BACKGROUND

Vehicle airbags present an injury risk when they accidentally inflate, striking an out-of-position or unsecured occupant or maintainer. Existing airbag anti-inflation safety devices electronically disable the explosive inflator of the airbag. However, the "ARMED" or "SAFE" state of the safety measure may not always be visible to a maintainer performing work on the seat. In some instances, parts of the seat must be removed to see if the airbag has been put into a safe mode against initiation. Thus, accidental deployment can occur when the system is thought to be in a "SAFE" state, but the system is actually in an "ARMED" state.

In addition, existing safety devices may also fail electronically, due to failed solder connections, resulting in injury of the maintainers. The existing safety features rely on preventing initiation of the explosive inflators and may provide no protection if that occurs. Further, existing airbag safety-features do not destroy the envelope of the airbag itself before it can impact the human occupant. Therefore, an improved airbag anti-inflation safety device may be desirable.

SUMMARY

The present disclosure describes a safety-device that prevents harm to vehicle occupants or maintainers from undesired lap-belt-mounted airbag deployment. The device can accomplish this by cutting, slicing, or puncturing an inflating airbag, using the energy of the bag inflating to force it against a cutting/slicing surface of a cutting member surrounding the airbag belt. Within examples, this prevents full inflation of the bag and the resultant impact for on an occupant near the airbag. The device provides an example of last-chance protection in cases where all other safety devices have failed. The device is visually obvious to vehicle occupants, providing positive visible confirmation that the safety measure is in effect.

In particular, in one example, a device is described. The device includes an elongated member having a first end and a second end. The device also includes a buckle retainer coupled to the first end of the elongated member. Further, the device includes a cutting member coupled to the second end of the elongated member. The cutting member includes a bottom section substantially perpendicular to the elongated member and a top section extending vertically from the bottom section. The cutting member also includes a through-hole defined by an interior surface of the bottom section of the cutting member and an interior surface of the top section of the cutting member.

In another example, a system is described. The system includes a seatbelt, comprising (i) a first section having a first end and a second end, wherein the first end of the first section is configured to be coupled to a seat, and wherein the second end of the first section includes a male buckle, and (ii) a second section having a first end and a second end, wherein the first end of the second section is configured to be coupled to the seat, and wherein the second end of the second section includes a female buckle. The system also includes an airbag coupled to the first section of the seatbelt. The system also includes an airbag expansion limiting device, comprising (i) an elongated member having a first end and a second end, (ii) a buckle retainer coupled to the first end of the elongated member, wherein the buckle retainer is configured to receive the male buckle, and (iii) a cutting member coupled to the second end of the elongated member, wherein the cutting member includes through-hole through which the first section of the seatbelt is positioned.

In still another example, a method is described. The method includes positioning a male buckle of a first section of a seatbelt through a through-hole of a cutting member of an airbag expansion limiting device, wherein the first section of the seatbelt includes an airbag. The method also includes inserting the male buckle into a buckle retainer of the airbag expansion limiting device, wherein the airbag expansion limiting device further includes an elongated member positioned between the cutting member and the buckle retainer, and wherein the elongated member has a length such that when the male buckle is inserted into the buckle retainer, the cutting member is positioned over approximately a midpoint of the airbag.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
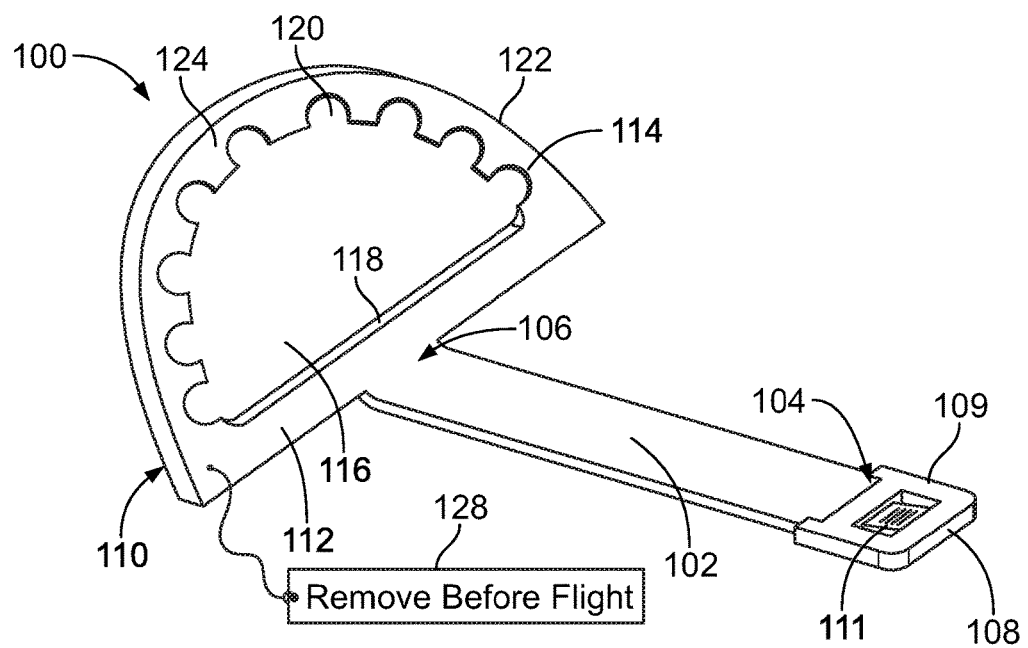
FIG. 1 is an illustration of an example device, according to an example embodiment.

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Within examples, a device is described to prevent harm to vehicle occupants or maintainers from undesired lap-belt-mounted airbag deployment. The device accomplishes this by cutting, slicing, or puncturing an inflating airbag, using the energy of the bag inflating to force it against a cutting/slicing surface of a cutting member surrounding the airbag belt. As such, within an example, the device does not require an energy source. The physical shape, size, and composition of the device may be selected to ensure that the airbag is destroyed before it reaches full inflation. Further, the device may be made in a variety of sizes, shapes, and/or materials to effectively cut open airbags made of different materials or airbags of varying shapes and sizes.

The cutting, slicing, or puncturing of the inflating airbag prevents full inflation of the bag and the resultant impact for on an occupant near the airbag. As such, the device provides last-chance protection in cases where all other safety devices have failed. The device is visually obvious to vehicle occupants, providing positive visible confirmation that the safety measure is in effect.

In operation, seatbelts with integral airbags are inserted into a through-hole of the device and fastened to the buckle retainer of the device. The presence of the device encircling the seatbelt visually indicates that the safety feature is active. The device can be applied whenever people are within impact-range of the airbag should it erroneously deploy. At an airplane manufacturing facility, for example, that would be any time the seats are installed on the airplane, or any time the airbag inflator could be activated. Airplane operators could also use the device to ensure safety during interiors maintenance activities. Use of the device as described above may prevent injury from airbag deployment while various manufacturing, vendor, and maintenance people work in close proximity to the installed airbag systems.

Various other features of the example devices and systems discussed above, as well as methods for using these devices, are also described hereinafter with reference to the accompanying figures.

Referring now to the figures, FIG. 1 illustrates a device 100 according to an example embodiment. As shown in FIG. 1, the device 100 may include an elongated member 102 having a first end 104 and a second end 106. The device 100 may also include a buckle retainer 108 coupled to the first end 104 of the elongated member 102. The device 100 may also include a cutting member 110 coupled to the second end 106 of the elongated member 102. As shown in FIG. 1, the transition between the second end 106 of the elongated member 102 and the cutting member 110 may be a smooth, radiused transition. Such a radiused transition may provide improved stress distribution when the device 100 is in use. The cutting member 110 may include a bottom section 112 substantially perpendicular to the elongated member 102 and a top section 114 extending vertically from the bottom section 112. The cutting member 110 may also include a through-hole 116 defined by an interior surface 118 of the bottom section 112 of the cutting member 110 and an interior surface 120 of the top section 114 of the cutting member 110.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. For example, the bottom section 112 is substantially perpendicular to the elongated member 102, and this can include the bottom section 112 being positioned at a 90° angle with respect to the elongated member 102. In other examples, this can include the bottom section 112 being positioned within a range of angles including between an 80°-100° angle with respect to the elongated member 102. Still further, in other examples, substantially perpendicular allows for a tolerance offset from 90°.

The elongated member 102 may have a length such that when a male buckle of a seatbelt is inserted into the buckle retainer 108, the cutting member 110 is positioned over approximately a midpoint of the airbag of the seatbelt. As such, the elongated member 102 has a length ranging from about 6 inches to about 12 inches. In one example, the elongated member 102 may be adjustable to a variety of lengths, based on the particular use case. In addition, the through-hole 116 may be sized such that the device 100 allows the airbag to initially expand, but not enough to injure anyone in the vicinity of the airbag. As such, the through-hole has a length ranging from about 8 inches to about 12 inches, and a width ranging from about 4 inches to about 6 inches.

As discussed in additional detail below, the buckle retainer 108 is configured to receive a male buckle from a seatbelt. As such, the buckle retainer 108 may take a variety of forms. In one example, as shown in FIG. 1, the buckle retainer 108 may include a channel 109 into which the male buckle slides. The channel 109 prevents the male buckle from moving in a vertical direction from the elongated member 102. The buckle retainer 108 may also include a button 111, and the male buckle may include a hole into which the button 111 is configured to fit. A user may then depress the button 111 and slide the male buckle away from the buckle retainer 108 to decouple the male buckle from the buckle retainer 108. Other arrangements for the buckle retainer 108 are possible as well.

Figure 2:
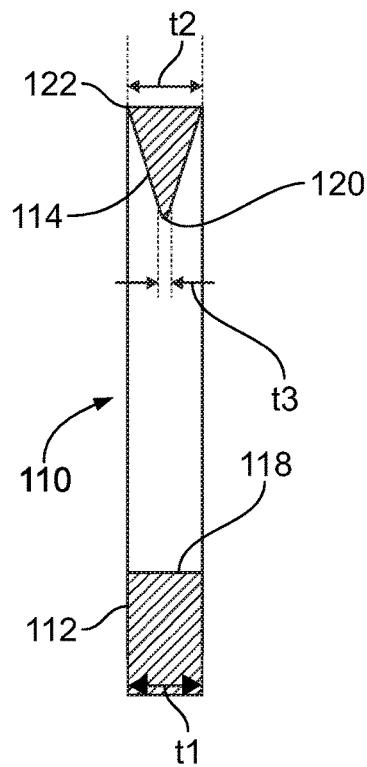
FIG. 2 is a cross-section view of the cutting member of the example device of FIG. 1, according to an example embodiment.

FIG. 2 is a cross-section view of the cutting member 110 of the example device 100 of FIG. 1. As shown in FIG. 2, the thickness (t1) of the bottom section 112 of the cutting member 110 has a uniform thickness, and the thickness (t2) of an exterior surface 122 of the top section 114 of the cutting member 110 is greater than the thickness (t3) of the interior surface 120 of the top section 114 of the cutting member 110, thereby defining a cutting surface for the cutting member 110. In one example, the thickness (t1) of the bottom section 112 of the cutting member 110 is equal to the thickness (t2) of the exterior surface 122 of the top section 114 of the cutting member 110. The thickness (t1) of the bottom section 112 of the cutting member 110 may range from about 0.5 inches to about 0.75 inches. The thickness (t2) of an exterior surface 122 of the top section 114 of the cutting member 110 may range from about 0.5 inches to about 0.75 inches (to match t1). The thickness (t3) of the interior surface 120 of the top section 114 of the cutting member 110 may range from about 0.0625 inches to about 0.125 inches. The thickness (t3) of the interior surface 120 of the top section 114 of the cutting member 110 may be of such a thickness to pierce an inflating airbag, but not so sharp as to cut an operator using the device 100.

In one example, as shown in FIG. 1, the interior surface 120 of the top section 114 of the cutting member 110 includes a plurality of circular or scalloped cutouts 124 having knife-edge shaped edges. In one example, the plurality of cutouts 124 are semi-circular. Such an arrangement may be beneficial to disperse the stress imposed on the cutting member 110 when an airbag deploys when the device 100 is in use. The plurality of cutouts 124 may provide multiple relatively sharp "corner-features" that would only act as puncturing surfaces when an airbag expands into the through-hole 116. For instance, if the encased non-inflated airbag rubbed against the interior surface 120 of the top section 114 of the cutting member 110, the encased airbag would not be exposed to the corners of the plurality of cutouts 124, preventing the encased bag-cover from being marred or damaged by the cutting member 110.

In such an example, the diameter of each of the plurality of cutouts 124 may range from about 0.5 inches to about 1.5 inches. In another embodiment, alternatively shaped cutouts may be used. In another embodiment, no cutouts are present, and the thickness (t3) of the interior surface 120 of the top section 114 of the cutting member 110 is sufficient to pierce an inflating airbag. As shown in FIG. 1, each corner of the through-hole 116 where the through-hole 116 meets the bottom section 112 may be radiused. Such a radiused transition may provide improved stress distribution when the device 100 is in use.

Figure 3A:
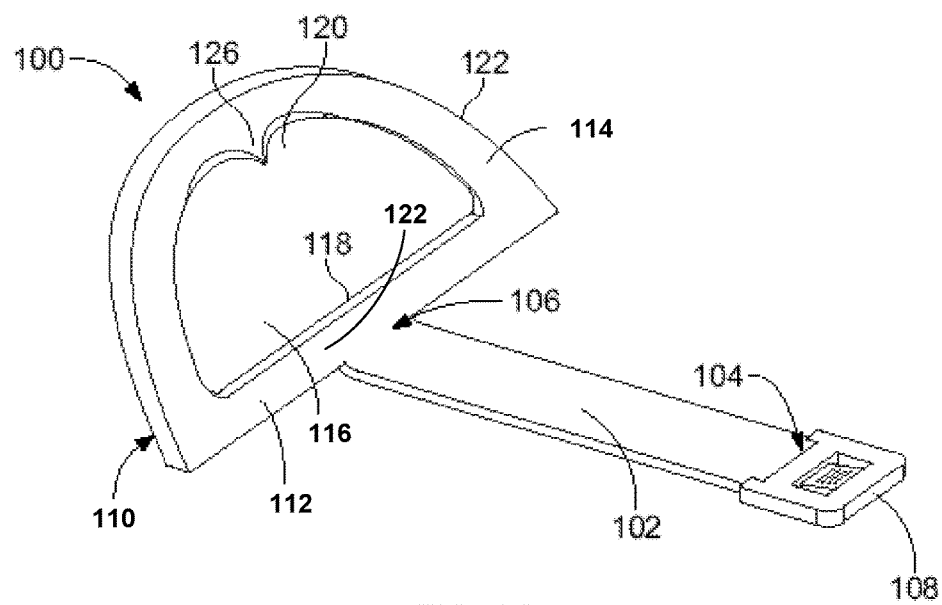
FIG. 3A is an illustration of another example device, according to an example embodiment.
Figure 3B:
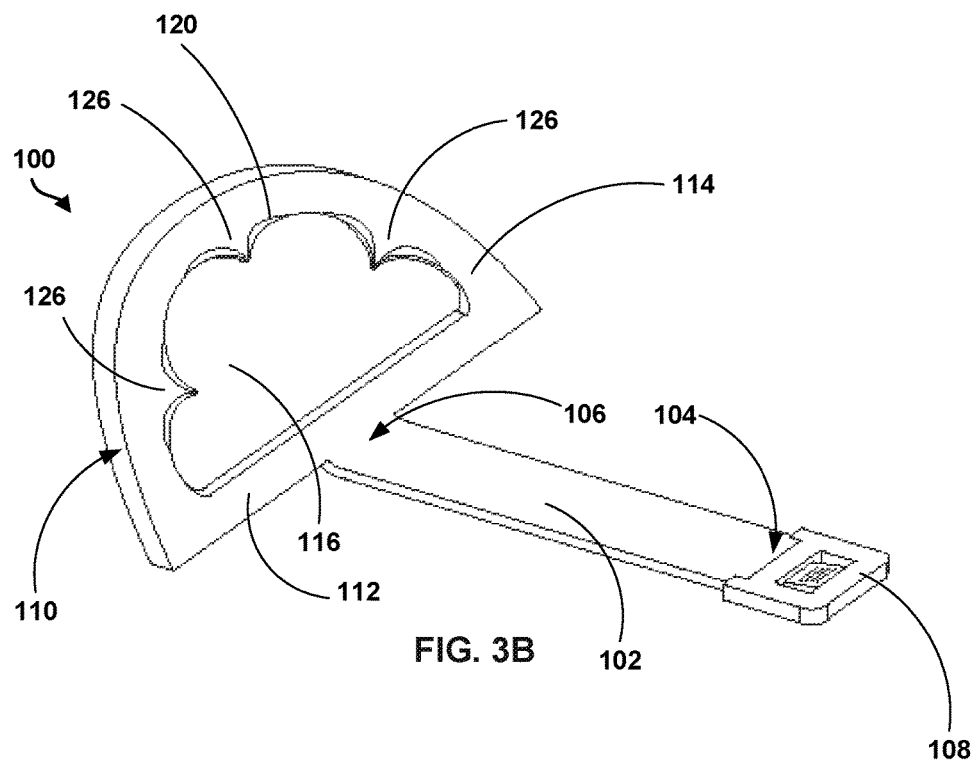
FIG. 3B is an illustration of another example device, according to an example embodiment.

FIG. 3A is an illustration of another embodiment of the device 100. In particular, as shown in FIG. 3A, the interior surface 120 of the top section 114 of the cutting member 110 includes a projection 126 directed into the through-hole 116. In such an embodiment, the projection 126 creates an acute, localized stress-riser in an expanding airbag which penetrates the airbag envelope, and the widening edges of the projection 126 expands the initial penetration into a progressively growing slit to thereby prevent full inflation of the airbag. In one particular example, as shown in FIG. 3A, the cutting member 110 includes a single projection 126 directed into the through-hole 116. In another example, as shown in FIG. 3B, the cutting member 110 includes three projections 126 directed into the through-hole 116. Other numbers of projections 126 are possible as well.

In one embodiment, as shown in FIG. 1, the cutting member 110 is semi-circular, such that the bottom section 112 of the cutting member 110 is substantially straight and the top section 114 of the cutting member 110 is curved. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. For example, the bottom section 112 is substantially straight if the longitudinal axis of the bottom section has a radius of curvature of 0°. In other examples, the bottom section 112 is substantially straight if the longitudinal axis of the bottom section has a radius of curvature between 0°-10°. Such an arrangement where the bottom section 112 is substantially straight provides a stable base of support forth the cutting member 110. In such an example, the cutting member 110 may have an inner-diameter ranging from about 8 inches to about 14 inches. In addition, as shown in FIG. 1, the device 100 may further include a visual indicator 128. The visual indicator 128 (shown reading "Remove Before Flight") provides a visual indication that the device 100 is in place, and further provides a reminder for a user to remove the device 100 before using the seatbelt.

In one embodiment, the device 100 is a single piece such that each of the elongated member 102, the buckle retainer 108, and the cutting member 110 comprise the same material. In such an example, the material may comprise one of a carbon fiber reinforced polymer, a nylon polymer, polycarbonate, polyethylene, polyimide, glass-filled polyamide, G10/FR4 fiberglass cloth/epoxy resin, glass or carbon-filled polyarylamide, or glass or carbon-filled polyamide imide.

Figure 4:
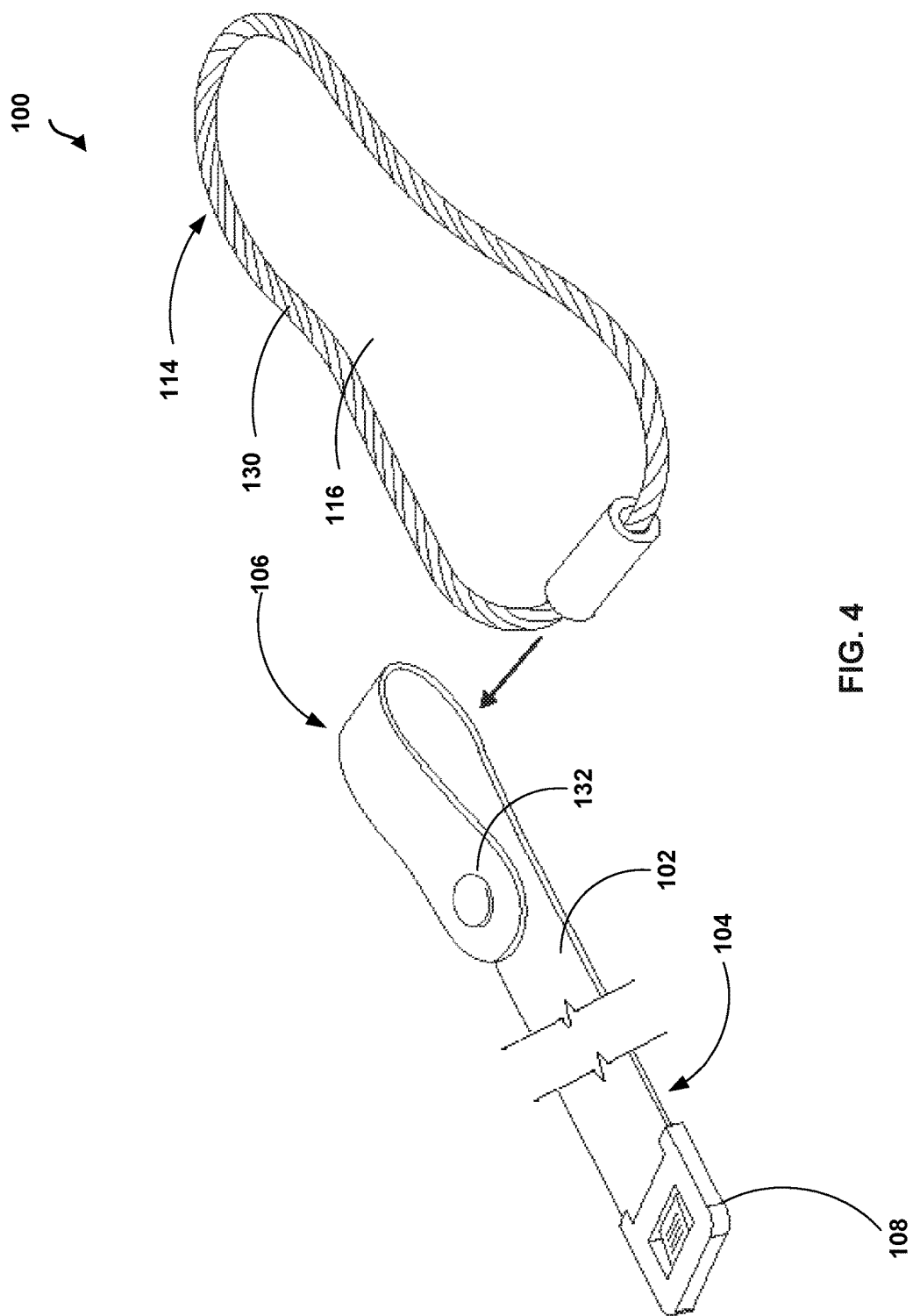
FIG. 4 is an illustration of another example device, according to an example embodiment.

FIG. 4 is an illustration of yet another embodiment of the device 100. In particular, as shown in FIG. 4, the cutting member 110 comprises a cable 130 having a first end and a second end. The cable 130 may comprise a stainless-steel cable, as an example. In one example, as shown in FIG. 4, the first end of the cable 130 may be swaged to the second end of the cable 130 to form a loop. The cable 130 may be coupled to the second end 106 of the elongated member 102. In one particular example, as shown in FIG. 4, the second end 106 of the elongated member 102 may comprise a snap-end retainer 132 configured to receive the looped cable 130. In such an embodiment, the snap-end retainer 132 may be opened to switch out the cable 130 for a cable having a different thicknesses based on the particular use case. For example, a thicker cable 130 may be required if the airbag in the seatbelt is more robust. In addition, a range of elongated members 102 of different length provide the adjustability to position the cable 130 over a range of seatbelt sizes. In use, in the embodiment as shown in FIG. 4 the airbag is configured to burst due to the severe constricting stress imposed by the cable 130.

Figure 5:
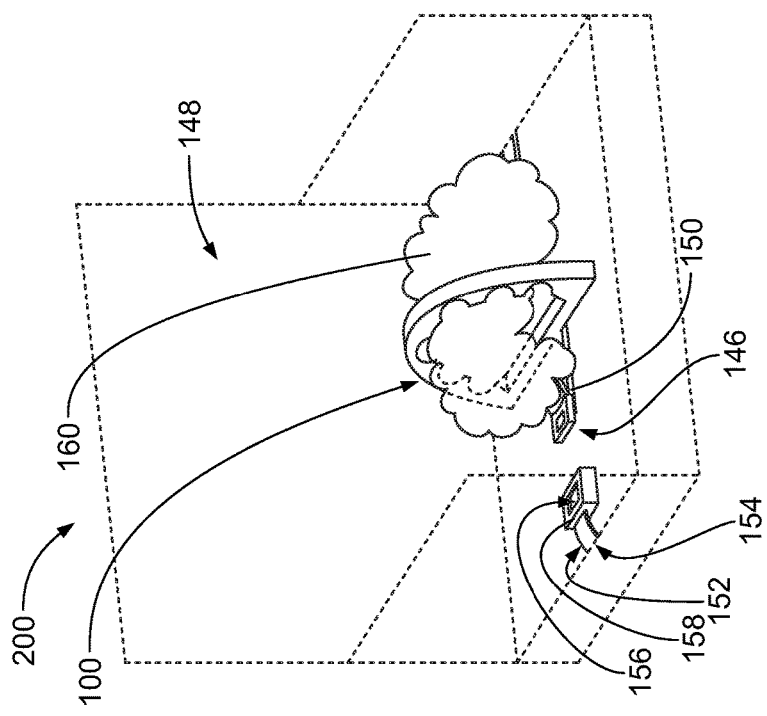
FIG. 5 is an illustration of an example system, according to an example embodiment.
Figure 6:
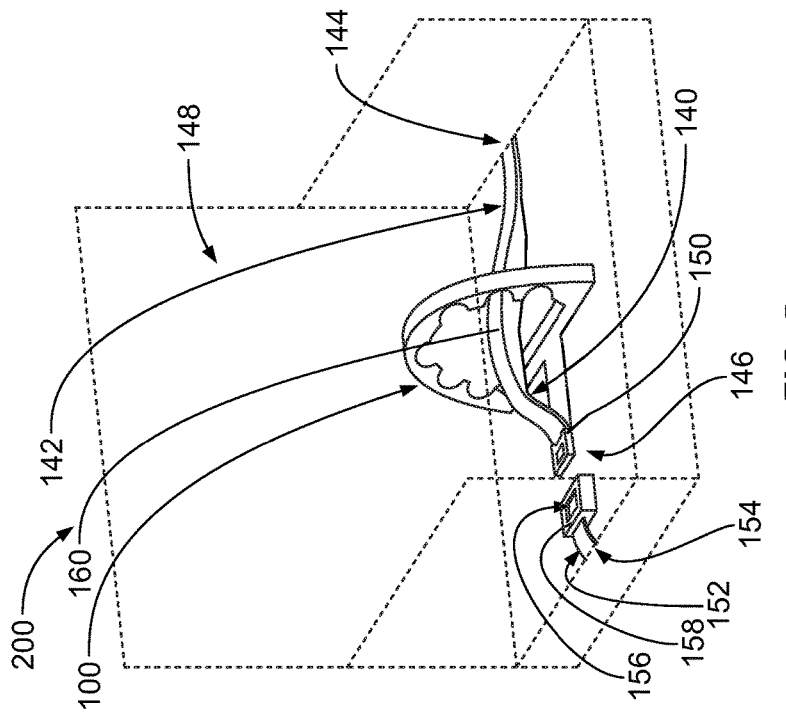
FIG. 6 is another illustration of the example system of FIG. 5, according to an example embodiment.
Figure 7:
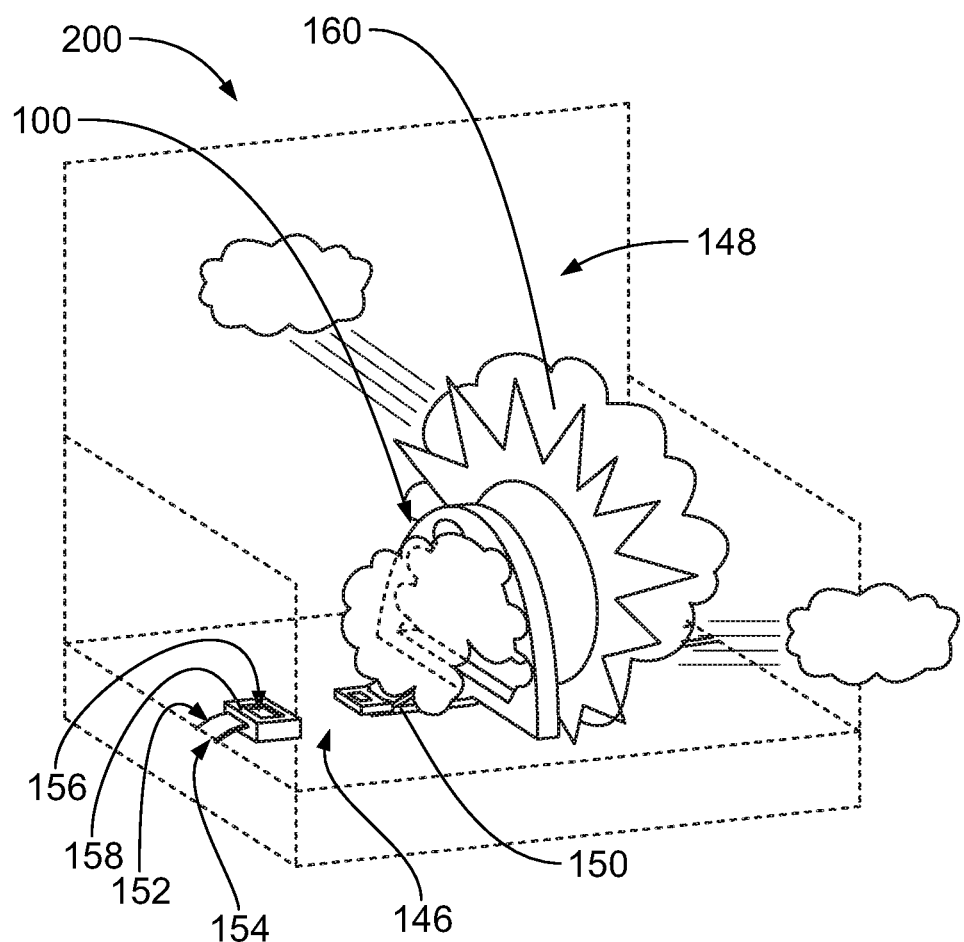
FIG. 7 is another illustration of the example system of FIG. 5, according to an example embodiment.

FIGS. 5-7 illustrate a system 200, according to an example embodiment. As shown in FIG. 5, the system 200 includes a seatbelt 140. The seatbelt 140 includes a first section 142 having a first end 144 and a second end 146. The first end 144 of the first section 142 is configured to be coupled to a seat 148, and the second end 146 of the first section 142 includes a male buckle 150. The seatbelt 140 also includes a second section 152 having a first end 154 and a second end 156. The first end 154 of the second section 152 is configured to be coupled to the seat 148, and the second end 156 of the second section 152 includes a female buckle 158. The system 200 also includes an airbag 160 coupled to the first section 142 of the seatbelt 140. The airbag 160 may be integral to the first section 142 of the seatbelt 140.

The system 200 also includes an airbag limiting device 100. The airbag limiting device 100 may include one or more of the features of the device 100 as described above in relation to FIGS. 1-4. In particular, the airbag limiting device 100 may include an elongated member 102 having a first end 104 and a second end 106. The airbag limiting device 100 may also include a buckle retainer 108 coupled to the first end 104 of the elongated member 102. The buckle retainer 108 is configured to receive the male buckle 150 of the first section 142 of the seatbelt 140. The airbag limiting device 100 may also include a cutting member 110 coupled to the second end 106 of the elongated member 102. The cutting member 110 includes through-hole 116 through which the first section 142 of the seatbelt 140 is positioned.

As shown in FIG. 5, the elongated member 102 has a length such that when the male buckle 150 is inserted into the buckle retainer 108, the cutting member 110 is positioned over approximately a midpoint of the airbag 160. Traditional airbag anti-inflation safety mechanisms include electrical safety interlocks that prevent the explosive inflator from activating. One such electrical safety interlock automatically activates when the first section 142 of the seatbelt 140 is separated from the second section 152 of the seatbelt (i.e., the male buckle 150 is removed from the female buckle 158). As such, by requiring a user to insert the male buckle 150 into the buckle retainer 108 of the elongated member 102, an additional level of safety is ensured.

In use, as shown in FIG. 6, the airbag limiting device 100 is sized such that the airbag 160 begins to inflate when activated. Traditional airbags may include a covering, so enabling the airbag 160 to inflate for a period ensures the cutting member 110 punctures the airbag itself, and not the airbag covering which may be more difficult to puncture.

FIG. 7 illustrates the explosive pressure of the airbag 160 against the cutting member 110 of the airbag limiting device 100. When the pressures get too great, the cutting member 110 slices through the airbag 160 causing complete airbag rupture, and allowing gasses to escape from the airbag 160. Because the airbag 160 is fully ruptured, it will not forcefully impact anyone in the vicinity of the airbag 160. Instead, such a person is only exposed to vented airbag gasses. The airbag limiting device 100 remains captive on the seatbelt 140, so it does not impose an impact risk.

Figure 8:
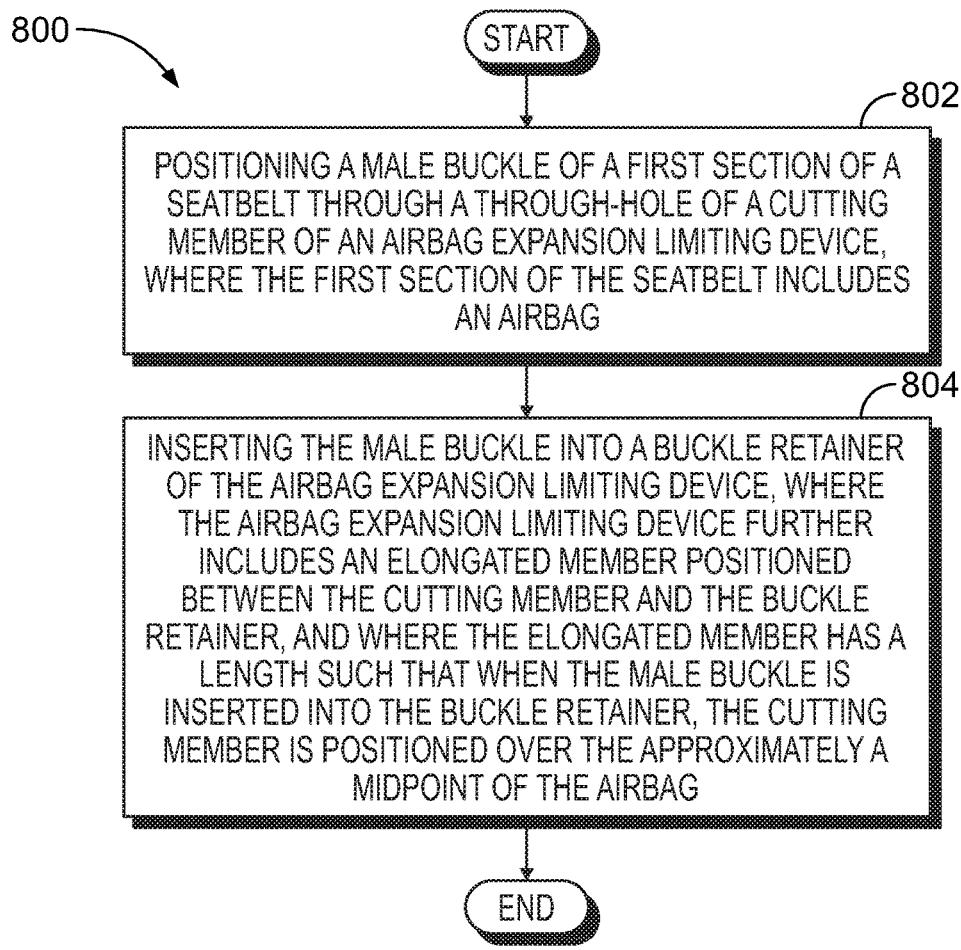
FIG. 8 is a flowchart of an example method, according to an example embodiment.

FIG. 8 is a flowchart of an example method according to an example embodiment. Method 800 shown in FIG. 8 presents an example of a method that could be used during formation of the device 100 and/or the system 200 as shown in FIGS. 1-7, for example. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art. Accordingly, certain operations may be performed in a different order or simultaneously. Additionally, those skilled in the art will appreciate that not all operations described need be performed.

Initially, at block 802, the method 800 includes positioning a male buckle of a first section of a seatbelt through a through-hole of a cutting member of an airbag expansion limiting device, where the first section of the seatbelt includes an airbag.

At block 804, the method 800 includes inserting the male buckle into a buckle retainer of the airbag expansion limiting device, where the airbag expansion limiting device further includes an elongated member positioned between the cutting member and the buckle retainer, and where the elongated member has a length such that when the male buckle is inserted into the buckle retainer, the cutting member is positioned over approximately a midpoint of the airbag. In one embodiment, the method 800 further includes decoupling the male buckle of the first section of the seatbelt from a female buckle of a second section of the seatbelt prior to positioning the male buckle through the through-hole of the cutting member. In another embodiment, the method 800 further includes in response to the airbag activating when the male buckle is inserted in the buckle retainer of the airbag expansion limiting device, puncturing the airbag with the cutting member.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for limiting expansion of an airbag on a seatbelt, the device comprising:

an elongated member having a first end and a second end;

a buckle retainer coupled to the first end of the elongated member, wherein the buckle retainer is configured to be removably coupled to a buckle of the seatbelt; and a cutting member coupled to the second end of the elongated member, wherein the cutting member includes a bottom section substantially perpendicular to the elongated member and a top section extending vertically from the bottom section, wherein the cutting member includes a through-hole defined by an interior surface of the bottom section of the cutting member and an interior surface of the top section of the cutting member, wherein the thorough-hole is configured to receive at least a portion of the seatbelt therethrough when the buckle retainer is coupled to the buckle of the seatbelt, and wherein the elongated member has a length such that when the buckle is inserted into the buckle retainer the cutting member is positioned over the airbag of the seatbelt.

2. The device of claim 1, wherein a thickness of the bottom section of the cutting member has a uniform thickness, and wherein a thickness of an exterior surface of the top section of the cutting member is greater than a thickness of the interior surface of the top section of the cutting member, thereby defining a cutting surface for the cutting member.

3. The device of claim 1, wherein the interior surface of the top section of the cutting member includes a plurality of cutouts.

4. The device of claim 3, wherein the plurality of cutouts are semi-circular.

5. The device of claim 1, wherein the cutting member is semi-circular, such that the bottom section of the cutting member is substantially straight and the top section of the cutting member is curved.

6. The device of claim 1, wherein the interior surface of the top section of the cutting member includes a plurality of projections directed into the through-hole.

7. The device of claim 1, wherein the device is a single piece such that each of the elongated member, the cutting member, and the buckle retainer comprise the same material.

8. The device of claim 7, wherein the material comprises one of a carbon fiber reinforced polymer, a nylon polymer, polycarbonate, polyethylene, or polyimide.

9. The device of claim 1, wherein the top section of the cutting member comprises a cable having a first end and a second end, wherein the first end of the cable is coupled to a first end of the bottom section of the cutting member, and wherein the second end of the cable is coupled to a second end of the bottom section of the cutting member.

10. A method, comprising:
positioning a male buckle of a first section of a seatbelt through the through-hole of the cutting member of the airbag expansion limiting device of claim 1, wherein the first section of the seatbelt includes an airbag; and
inserting the male buckle into the buckle retainer of the airbag expansion limiting device.

11. The method of claim 10, further comprising:
decoupling the male buckle of the first section of the seatbelt from a female buckle of a second section of the seatbelt prior to positioning the male buckle through the through-hole of the cutting member.

12. The method of claim 10, further comprising:
in response to the airbag activating when the male buckle is inserted in the buckle retainer of the airbag expansion limiting device, puncturing the airbag with the cutting member.

13. The device of claim 1, wherein the buckle retainer includes a channel and configured to prevent the buckle from moving in a vertical direction from the elongated member, and wherein the buckle retainer includes a button configured to surround a hole in the buckle to thereby prevent the buckle from moving in a horizontal direction from the elongated member.

\* \* \* \* \*